United States Patent
Yoshikawa (10) Patent No.: US 7,116,351 B2
(45) Date of Patent: *Oct. 3, 2006

(54) IMAGING DEVICE

(75) Inventor: Koichi Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 651 days.

This patent is subject to a terminal disclaimer.

(21) Appl. No.: 10/281,523

(22) Filed: Oct. 28, 2002

(65) Prior Publication Data

US 2003/0090788 A1 May 15, 2003

(30) Foreign Application Priority Data

Oct. 29, 2001 (JP) .............................. 2001-331102

(51) Int. Cl.
*H04N 7/00* (2006.01)
*G02B 13/06* (2006.01)

(52) U.S. Cl. ........................................ 348/36; 359/725

(58) Field of Classification Search ................. 348/36; 396/20, 21, 427; 359/377, 403, 471, 725

See application file for complete search history.

(56) References Cited

U.S. PATENT DOCUMENTS 6,628,897 B1 * 9/2003 Suzuki ......................... 396/20
6,768,598 B1 * 7/2004 Yoshikawa ................... 359/725

* cited by examiner

*Primary Examiner*—Gims Philippe
*Assistant Examiner*—Erick Rekstad
(74) *Attorney, Agent, or Firm*—Finnegan, Henderson, Farabow, Garrett & Dunner, L.L.P.

(57) ABSTRACT

An imaging device includes a plurality of plane mirrors disposed into a polygonal pyramid shape, and a plurality of cameras disposed so as to individually face to the plurality of plane mirrors, wherein each of the plurality of cameras includes a lens, and an incident angle of a light beam traveling along an optical axis of the lens of each of the plurality of cameras on the corresponding one of the plurality of plane mirrors is less than 45°. With this configuration, the sizes of the mirrors and the whole size of the imaging device are reduced, to thereby miniaturize the imaging device.

4 Claims, 9 Drawing Sheets

IMAGING DEVICE

BACKGROUND OF THE INVENTION

The present invention relates to an imaging device capable of acquiring an image over a wide-angle field, specifically, an image over an omnidirectional or entire circumferential field.

As is well known, there have been developed various camera systems of a type of simultaneously acquiring images over an omnidirectional or entire circumferential field by a number of video cameras contained in one housing.

One of these camera systems has been proposed in U.S. Pat. No. 6,115,176, wherein a plurality of mirrors are disposed into a polygonal pyramid shape in such a manner that centers of view of the mirrors virtually correspond to each other, to thereby eliminate parallax caused among the plurality of cameras.

Figure 1:
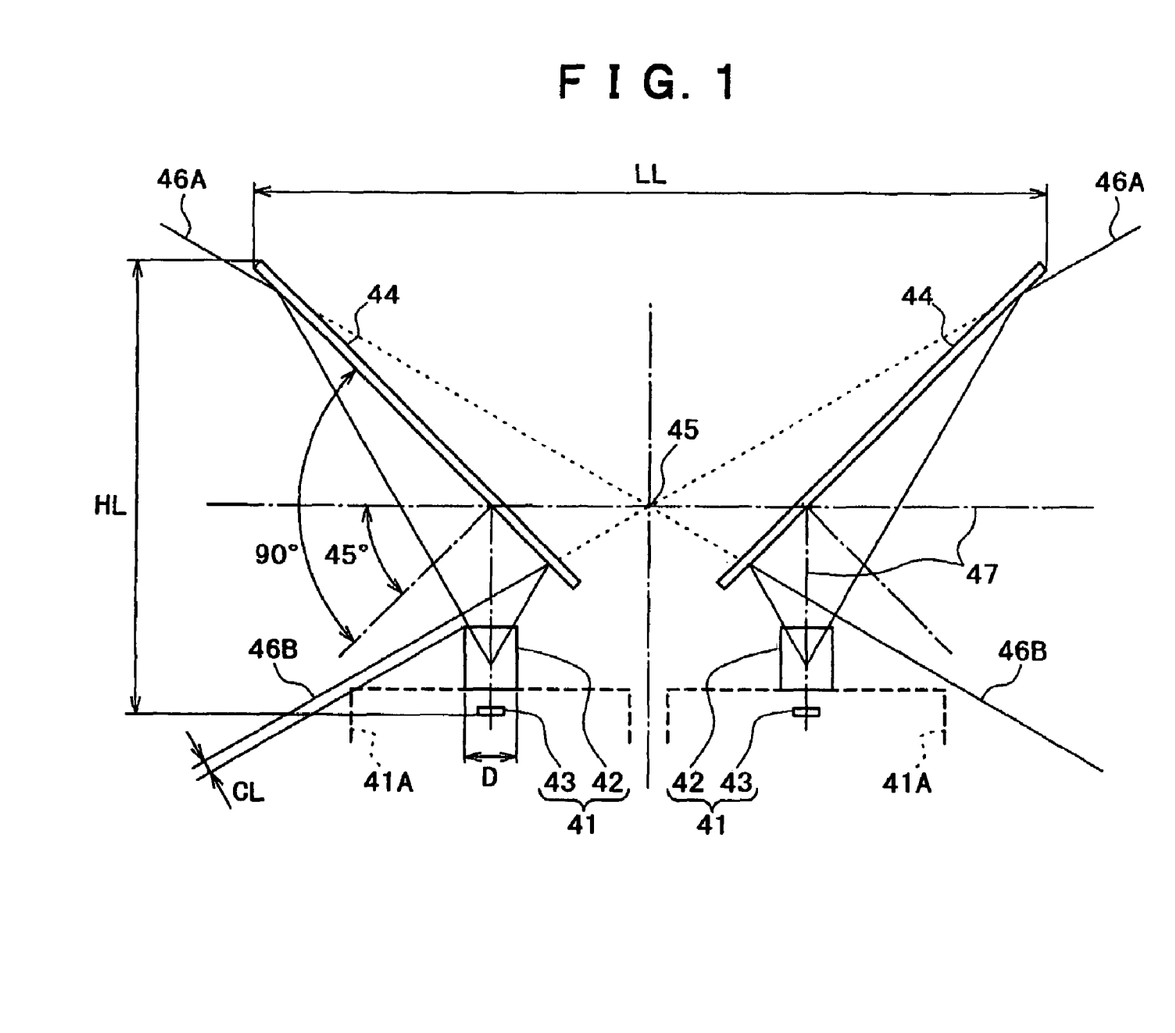
FIG. 1 is a schematic view showing a configuration of a related art imaging device using plane mirrors disposed into a polygonal pyramid shape.

FIG. 1 is a schematic sectional view showing a configuration of one example of a related art imaging device using a plurality of mirrors disposed into a polygonal pyramid shape as described above.

Referring to FIG. 1, the imaging device includes a plurality (eight, in this example) of plane mirrors 44 disposed into a polygonal (octagonal, in this example) pyramid shape, and cameras 41 of the same number as that of the plane mirrors 44 are disposed in such a manner as to individually face to the plane mirrors 44. In the figure, however, only the two plane mirrors 44 and the two cameras 41 disposed on a vertical plane passing through a center line of the imaging device are shown.

Each of the cameras 41 is provided with a lens 42 and an imaging element 43 in such a manner that the lens 42 is mounted to a camera body (not shown) in which the imaging element 43 and other components are contained.

In this imaging device, a light beam 46A passing through an uppermost end of the field of view expressed by an angle of view, a light beam 46B passing through a lowermost end of the field of view, and a light beam traveling along a lens optical axis 47 reflect from each of the mirrors 44 and enter the lens 42 of the corresponding camera 41, to form an image on the imaging element 43 of the camera 41.

In this case, by making virtual centers 45 of view of the plane mirrors 44 substantially correspond to each other, it is possible to suppress parallax caused among the plurality of cameras 41, and hence to acquire an image over a wide-angle field, specifically, an image over an omnidirectional or entire circumferential field by combining the images acquired by the plurality of cameras 41 with each other.

In this imaging device, as shown in FIG. 1, an incident angle of a light beam traveling along the lens optical axis 47 on each of the plane mirror 44 is set to 45°. Accordingly, the light beam traveling along the lens optical axis 47 enters the plane mirror 44 in the horizontal direction, reflects from the plane mirror 44, and enters the lens 42 in the vertical direction.

By the way, in the figure, character CL denotes a distance between the light beam 46B passing through the lowermost end of the field of view and a corner of a leading end portion of each lens 42.

To prevent the corner of the leading end of the lens 42 from being taken in an image, that is, to acquire an image without any "vignetting" by the corner of the leading end of the lens 42, the distance CL is required to satisfy a relationship of CL>0.

As shown in FIG. 1, the whole size of the imaging device is mainly determined by a height HL from an upper end of each plane mirror 44 and a lower end of the corresponding camera 41 (more specifically, a lower end of the imaging element 43) and a size LL of an upper surface of the inverted octagonal pyramid formed by the mirrors 44 (more specifically, a distance LL between the upper ends of two, facing to each other, of the mirrors 44 forming the octagonal pyramid).

To miniaturize the imaging device, both the height HL and the distance LL are required to be made small.

Figure 2:
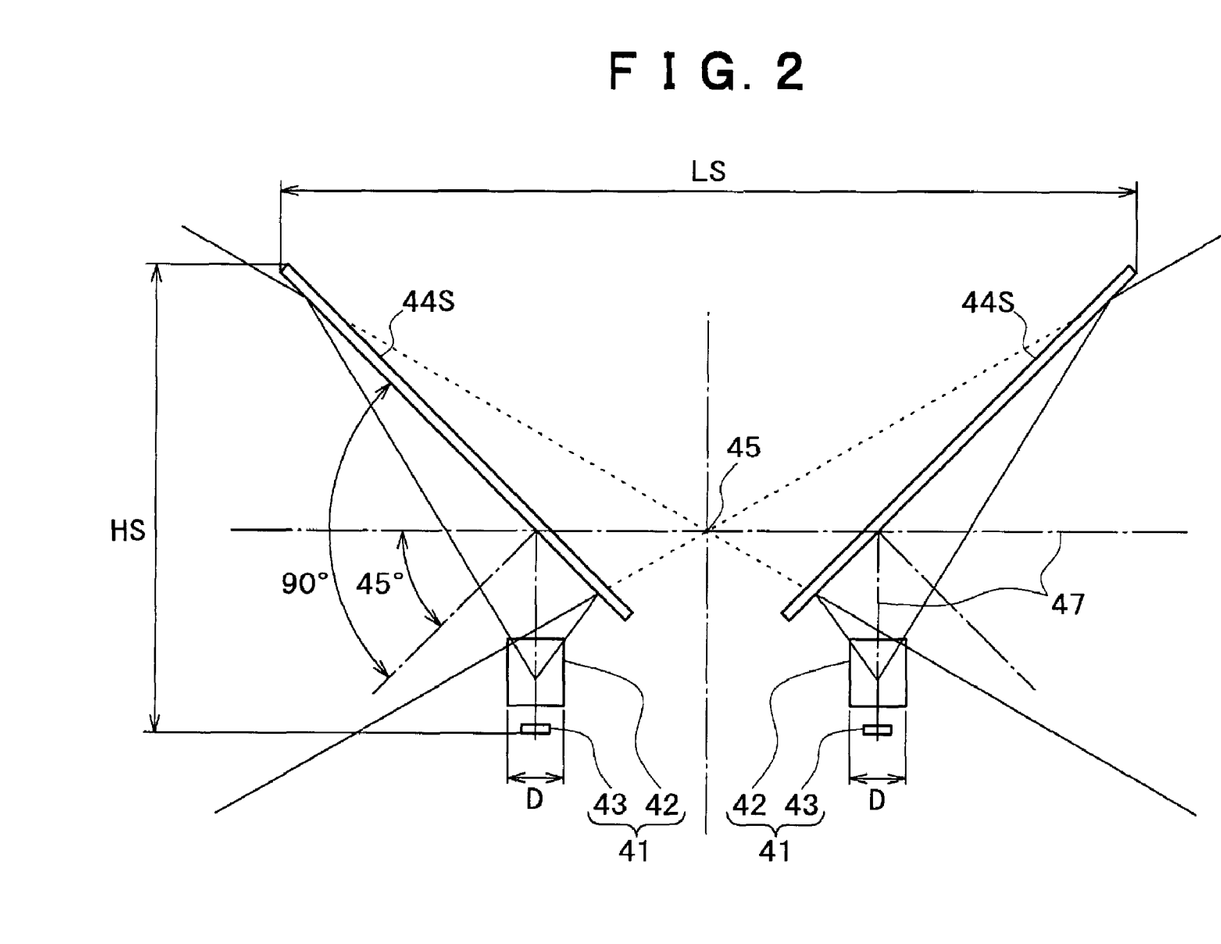
FIG. 2 is a schematic view showing another configuration of the related art imaging device shown in FIG. 1, wherein cameras are made close to the plane mirrors.

For example, to make both the height HL and the distance LL, it may be considered to make the camera 41 (lens 42 and the imaging device 43) close to the plane mirror 44. Such a configuration is shown in FIG. 2. As shown in FIGS. A and 2, a plane mirror 44S in this configuration can be made smaller than the plane mirror 44 in the configuration shown in FIG. 1. As a result, a height HS from an upper end of the mirror 44S to a lower end of the corresponding camera 41 in the configuration shown in FIG. 2 becomes smaller than the above-described height HL in the configuration shown in FIG. 1 (HS<HL), and a size LS of an upper surface of the inverted octagonal pyramid formed by the plane mirrors 44S in the configuration shown in FIG. 2 becomes smaller than the above-described size LL in the configuration shown in FIG. 1 (LS<LL), to thereby miniaturize the imaging device.

The configuration shown in FIG. 2, however, has a disadvantage that a distance between a light beam passing through a lowermost end of the field of view expressed by an angle of view and a corner of a leading end of each lens 42 becomes negative, and therefore, the "vignetting" by the corner of the leading end of the lens 42 occurs in an image.

Accordingly, to miniaturize the imaging device, it is required to make both the height HL and the distance LL as small as possible while keeping the distance CL between the light beam passing through the lowermost end of the field of view and the corner of the leading end of the lens 42 at a positive value.

In this case, a diameter of a leading end portion of the lens 42 of each camera 41 has a limitation to miniaturization of the imaging device.

As a result, the camera 41 cannot be made close to the corresponding plane mirror from a position at which the distance CL becomes zero.

Also, as shown by a broken line in FIG. 1, in the case where a size (particularly, a lateral width) of a camera body 41A in which the imaging device 43 and the like are contained is large relative to the lens 42, if the camera 41 is made close to the plane mirror, the camera body 41A thereof interferes with that of the adjacent camera 41. For example, in the case of a camera using three CCD imaging elements, a camera body of the camera becomes large.

This limitation further brings a difficulty in miniaturization of the imaging device.

Also, in the configuration of the imaging device shown in FIG. 1, the incident angle of a light beam traveling along the optical axis 47 of the lens 42 on the corresponding plane mirror 44 is set to 45°, and such a positional relationship determines the dimension of the plane mirror 44, with a result that the sizes of the plane mirrors 44 forming the octagonal pyramid and the whole size of the imaging device become large.

In addition, as described above, the whole size of the imaging device is mainly determined by the height HL from the upper end of the plane mirror 44 to the lower end of the camera 41 and the size LL of the upper surface of the inverted octagonal pyramid formed by the plane mirrors 44.

Since the values of the height HL and the size LL differ depending on the distance CL between the light beam passing through the lowermost end of the field of view and a corner of a leading end of the lens 42, the distance CL is required to be suitably set.

However, since the virtual centers 45 of view of the plurality of plane mirrors 44 can be made to substantially correspond to each other irrespective of the value of the distance CL, the distance CL can be set to an arbitrary value. For this reason, according to the related art imaging device, the distance CL has been not set at a suitable value, with a result that the whole size of the imaging device has become large.

SUMMARY OF THE INVENTION

An object of the present invention is to provide an imaging device capable of acquiring an image over a wide-angle field, wherein the imaging device can be miniaturized by reducing sizes of mirrors and the whole size of the imaging device.

To achieve the above object, according to a first aspect of the present invention, there is provided an imaging device including a plurality of plane mirrors disposed into a polygonal pyramid shape, and a plurality of cameras disposed so as to individually face to the plurality of plane mirrors, wherein each of the plurality of cameras includes a lens, and an incident angle of a light beam traveling along an optical axis of the lens of each of the plurality of cameras on the corresponding one of the plurality of plane mirrors is less than 45°.

With this configuration, the incident angle of a light beam traveling along an optical axis of the lens of each of the plurality of cameras on the corresponding plane mirror is set to be less than 45°. As a result, it is possible to make a height from an upper end of each plane mirror and a lower end of the corresponding camera small and also make a bottom area of the polygonal pyramid formed by the plane mirrors small, and hence to miniaturize the entire imaging device.

According to a second aspect of the present invention, there is provided an imaging device including a plurality of plane mirrors disposed into a polygonal pyramid shape, and a plurality of cameras disposed so as to individually face to the plurality of plane mirrors, wherein each of the plurality of cameras includes a lens and an imaging element, and letting D be a diameter of a leading end portion of the lens of each of the plurality of cameras, "f" be a focal distance of the lens, and A be a diagonal length of the imaging element of each of the plurality of cameras, the values D, "f" and A are determined to satisfy equations of D/A<4 and f/D>0.15.

With this configuration, the diameter D of a leading end portion of the lens of each camera, the focal distance "f" of the lens, and the diagonal length A of the imaging element of the camera are determined to satisfy equations of D/A<4 and f/D>0.15. As a result, in a state that the diagonal length A of the imaging element and the focal distance "f" of the lens are determined, the diameter D of the leading end of the lens can be made small, to thereby miniaturize the imaging device.

According to a third aspect of the present invention, there is provided an imaging device including a plurality of plane mirrors disposed into a polygonal pyramid shape, and a plurality of cameras disposed so as to individually face to the plurality of plane mirrors, wherein each of the plurality of cameras includes a lens and an imaging element, and letting C be a distance between a corner of a leading end portion of the lens of each of the plurality of cameras and a light beam passing through an end, closest to the corner of the lens, of the field of imaging expressed by an angle of view, and A be a diagonal length of the imaging element of each of the plurality of cameras, the values C and A are determined to satisfy an equation of 0<C<2A.

With this configuration, the distance C between a corner of a leading end portion of the lens of each camera and a light beam passing through an end, closest to the corner of the lens, of the field of imaging expressed by an angle of view, and the diagonal length A of the imaging element of the camera are determined to satisfy an equation of 0<C<2A. As a result, in a state that the diagonal length A of the imaging device is determined, the distance C between a corner of a leading end portion of the lens of the camera and a light beam passing through an end, closest to the corner of the lens, of the field of imaging can be made small, to thereby miniaturize the imaging device.

BRIEF DESCRIPTION OF THE DRAWINGS

Other features and advantages of the present invention will be more apparent from the following description in conjunction with the accompanying drawings in which.

DETAILED DESCRIPTION OF THE PREFERRED EMBODIMENTS

The present invention provides an imaging device including a plurality of plane mirrors disposed into a polygonal pyramid shape, and a plurality of cameras disposed so as to individually face to the plurality of plane mirrors, wherein each of the plurality of cameras includes a lens, and an incident angle of a light beam traveling along an optical axis of the lens of each of the plurality of cameras on the corresponding one of the plurality of plane mirrors is less than 45°.

The above imaging device may further include a lens group composed of a plurality of lenses, wherein the plane mirrors be disposed between the lens group and a lens group composed of the lenses of the plurality of cameras.

The present invention also provides an imaging device including a plurality of plane mirrors disposed into a polygonal pyramid shape, and a plurality of cameras disposed so as to individually face to the plurality of plane mirrors, wherein each of the plurality of cameras includes a lens and an imaging element, and letting D be a diameter of a leading end portion of the lens of each of the plurality of cameras, "f" be a focal distance of the lens, and A be a diagonal length of the imaging element of each of the plurality of cameras, the values D, "f" and A are determined to satisfy equations of D/A<4 and f/D>0.15.

The present invention further provides an imaging device including a plurality of plane mirrors disposed into a polygonal pyramid shape, and a plurality of cameras disposed so as to individually face to the plurality of plane mirrors, wherein each of the plurality of cameras includes a lens and an imaging element, and letting C be a distance between a corner of a leading end portion of the lens of each of the plurality of cameras and a light beam passing through an end, closest to the corner of the lens, of the field of imaging expressed by an angle of view, and A be a diagonal length of the imaging element of each of the plurality of cameras, the values C and A are determined to satisfy an equation of 0<C<2A.

The above-described composing elements of the present invention will be hereinafter more fully described by way of preferred embodiments with reference to the accompanying drawings.

[Embodiment 1]

A first embodiment of an imaging device of the present invention will be described with reference to FIG. 3.

Figure 3:
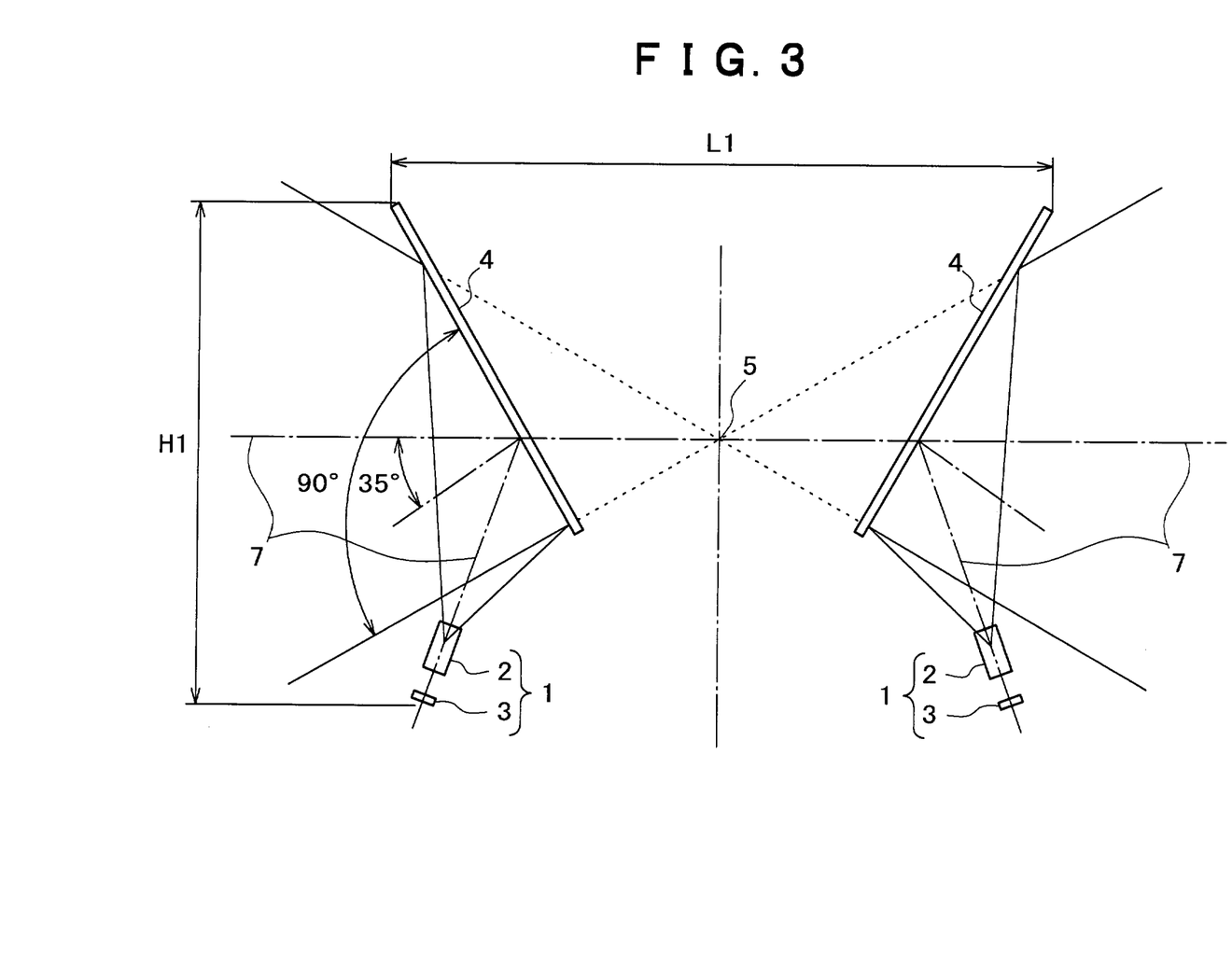
FIG. 3 is a schematic view showing a configuration of a first embodiment of an imaging device of the present invention.

FIG. 3 is a schematic sectional view showing a configuration of the first embodiment of the imaging device of the present invention. It is to be noted that the cross-section of the imaging device shown in the figure is taken along a vertical plane passing through a center line of the imaging device.

Referring to FIG. 3, the imaging device according to this embodiment includes eight plane mirrors 4 disposed into an octagonal pyramid shape, and eight cameras 1 disposed in such a manner as to individually face to the eight plane mirrors 4. In the figure, however, only the two plane mirrors 4 and the two cameras 1 disposed on a vertical plane passing through a center line of the imaging device are shown.

It is to be noted that the eight plane mirrors 4 are provided in this embodiment; however, the present invention is not limited thereto but may be configured such that a plurality of the plane mirrors 4 may be disposed in a polygonal pyramid shape and the cameras 1 of the same number be disposed in such a manner as to individually face to the plurality of the plane mirrors 4.

Each of the cameras 1 is provided with a lens 2 and an imaging element 3 in such a manner that the lens 2 is mounted to a camera body (not shown) in which the imaging element 3 and the like are housed.

A light beam reflects from each of the plane mirrors 4 and enters the lens 2 of the corresponding camera 1, to form an image on the imaging element 3 of the camera 1.

As shown in FIG. 3, the imaging device in this embodiment is further configured such that virtual centers 5 of view of the plurality of plane mirrors 4 are made to substantially correspond to each other. As a result, it is possible to suppress parallax caused among the plurality of cameras 1, and hence to acquire an image over a wide-angle field, specifically, over an omnidirectional or entire circumferential field by combining the images formed by the plurality of cameras 1 with each other.

According to the imaging device in this embodiment, particularly, an incident angle of a light beam traveling along a lens optical axis 7 on each of the plane mirrors 4 is set to 35°.

A light beam traveling along the lens optical axis 7 enters the plane mirror 4 in the horizontal direction, reflects from the plane mirror 4, and enters the lens 2 in the direction tilted from the vertical direction.

With this configuration of the imaging device in this embodiment, the whole height of the imaging device is equivalent to a height H1 from an upper end of each of the plane mirrors 4 to a lower end of the corresponding camera 1 (more specifically, a lower end of the imaging element 3). The whole size of the imaging device is mainly determined by the height H1 and a size L1 of an upper surface of the inverted octagonal pyramid formed by the plane mirrors 4. It is to be noted that the octagonal pyramid formed by the plane mirrors 4 is inverted, and therefore, the upper surface of the inverted octagonal pyramid is equivalent to the bottom surface of the octagonal pyramid.

The effect of the first embodiment will be described later in comparison with a first comparative example.

[Embodiment 2]

A second embodiment of the imaging device of the present invention, which is modified from the first embodiment of the imaging device shown in FIG. 3, will be described with reference to FIG. 4.

This embodiment has the same configuration as that of the first embodiment, except that lenses forming a front lens group 8 are individually disposed in front of the plurality of plane mirrors 4. Accordingly, the plurality of plane mirrors 4 are individually disposed between the lenses forming the front lens group 8 and the lenses 2 mounted to the camera bodies of the cameras 1, which lenses form a rear lens group 2. That is to say, the plane mirrors 4 are disposed between the two lens groups each of which is composed of the plurality of lenses.

Even in the imaging device in this embodiment, the incident angle of a light beam traveling along the lens optical axis 7 on each of the plane mirrors 4 is set to 35°.

With this configuration of the imaging device in this embodiment, the whole height of the imaging device is equivalent to a height HH1 of the front lens group 8, and the whole size of the imaging device is mainly determined by the height HH1 and a size L1 of an upper surface of the inverted polygonal shape formed by the plane mirrors 4.

The other features of this embodiment are the same as those of the first embodiment shown in FIG. 3, and therefore, other parts corresponding to those in the first embodiment are denoted by the same reference numerals, and the overlapped description thereof is omitted.

The effect of the second embodiment will be described later in comparison with a second comparative example.

[Comparative Examples 1 and 2]

Figure 5:
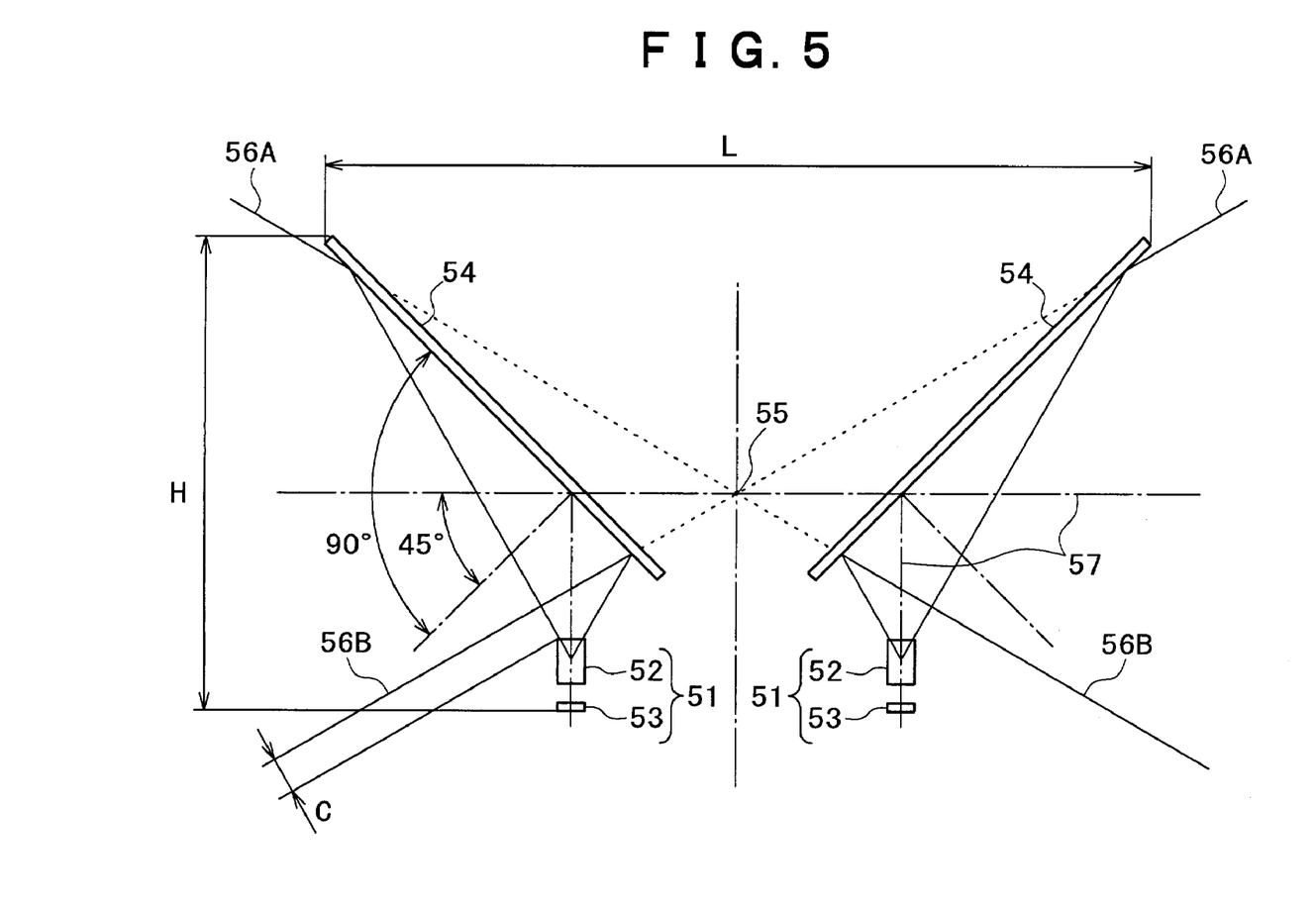
FIG. 5 is a schematic view showing a configuration of a first comparative example of an imaging device using plane mirrors disposed into a polygonal pyramid shape.
Figure 6:
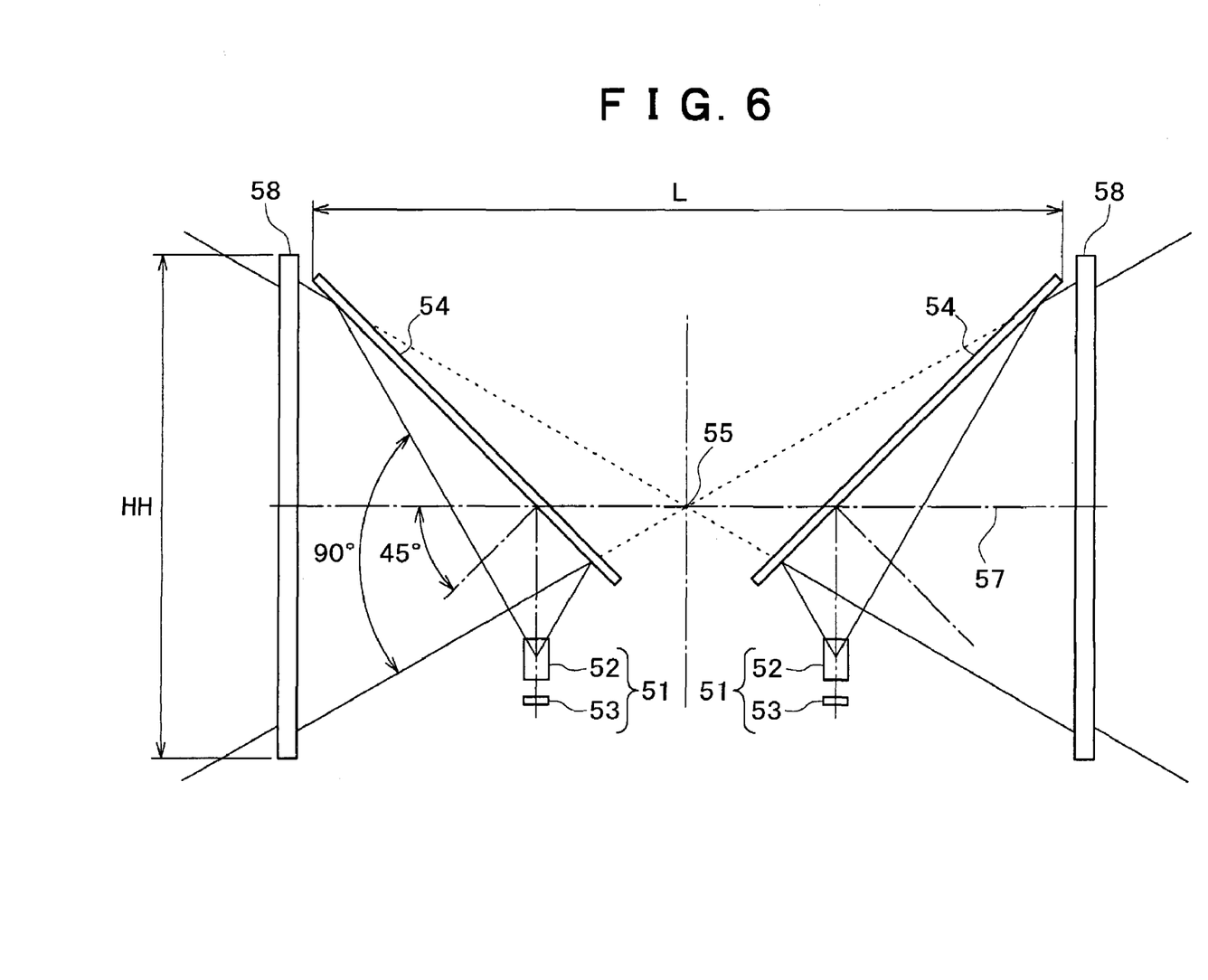
FIG. 6 is a schematic sectional view showing a configuration of a second comparative example of an imaging device, wherein a front lens group is added to the imaging device shown in FIG. 5.

The effect of an incident angle of a light beam traveling along a lens optical axis on a plane mirror will be examined by way of first and second comparative examples with reference to FIGS. 5 and 6.

Figure 4:
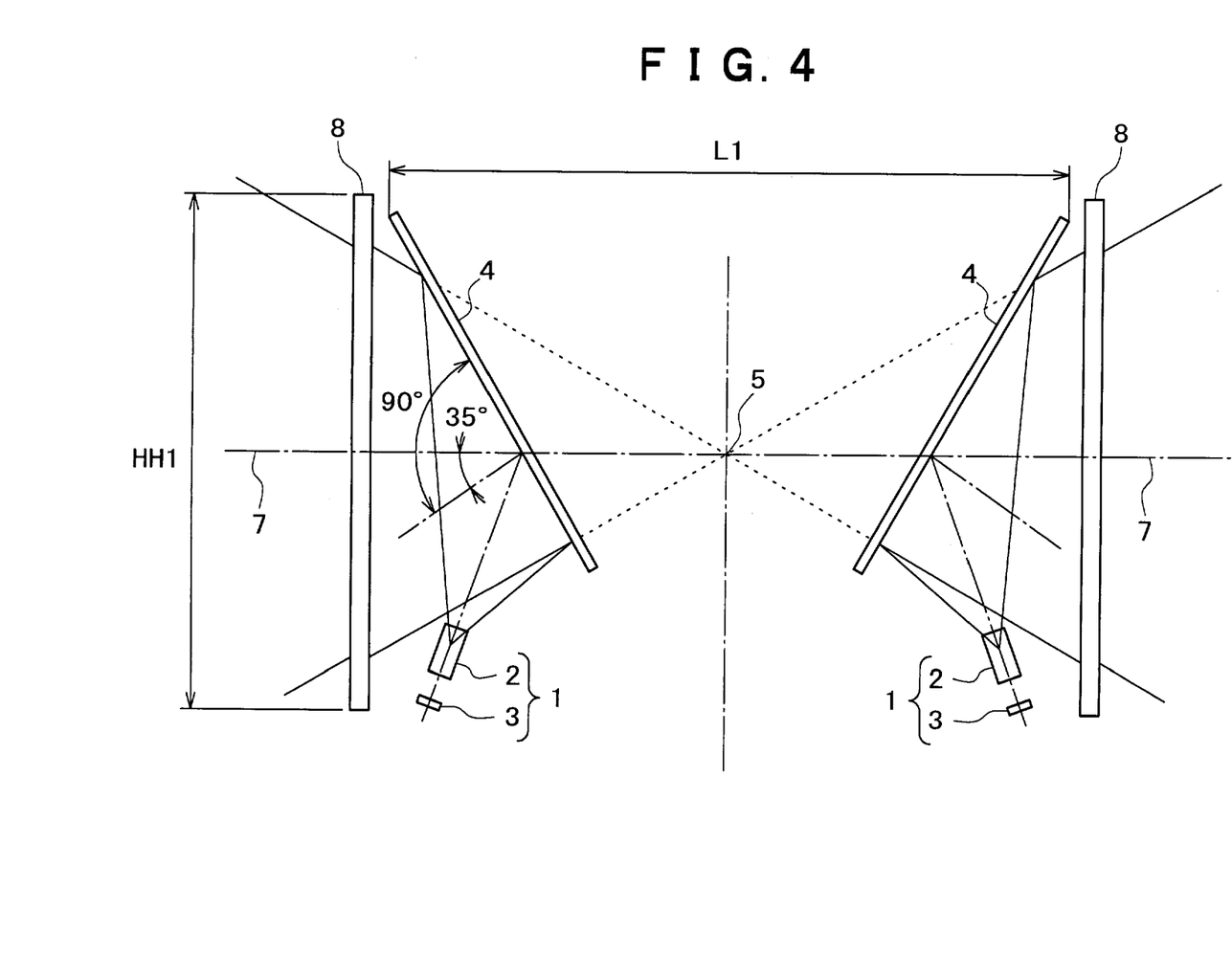
FIG. 4 is a schematic view showing a configuration of a second embodiment of the imaging device of the present invention, wherein a front lens group is added to the imaging device shown in FIG. 3.

The first comparative example shown in FIG. 5 has the same configuration as that of the first embodiment shown in FIG. 3, except that the incident angle is set to 45°, and the second comparative example shown in FIG. 6 has the same configuration as that of the second embodiment shown in FIG. 4, except that the incident angle is set to 45°.

Specifically, a lens 52 in this embodiment shown in FIG. 5 is the same as the lens 2 in the first embodiment shown in FIG. 3. The size of the camera 51 using the lens 52 in this embodiment is equal to that of the camera 1 using the lens 2 in the first embodiment, the distance between the lens 52 and a plane mirror 54 in this embodiment is equal to that between the lens 2 and the plane mirror 4 in the first embodiment, and the field of view expressed by an angle of view in this embodiment is equal to that of the first embodiment.

The imaging device in the second comparative example shown in FIG. 6 has the same configuration as that of the imaging device in the first comparative example shown in FIG. 5, except that like the front lens group 8 in the second embodiment shown in FIG. 4, a front lens group 58 is additionally provided.

In the configuration of the imaging device in the first comparative example shown in FIG. 5, the whole height of the imaging device (equivalent to a height from an upper end of the plane mirror 54 and a lower end of the camera 51) is denoted by character H, and a size of an upper surface of the inverted polygonal shape formed by the plane mirrors 54 is denoted by character L.

As a result of comparison of the height H and the size L in the first comparative example with the height H1 and L1 in the first embodiment, the relationships of H1<H and L1<L are given. Accordingly, the imaging device (incident angle: 35°) in the first embodiment shown in FIG. 3 is apparently smaller than the imaging device in the first comparative example (incident angle: 45°) shown in FIG. 5.

In the configuration of the imaging device in the second comparative example shown in FIG. 6, the whole height of the imaging device (equivalent to a height of the front lens group 58) is denoted by character HH, and a size of an upper surface of the inverted polygonal pyramid formed by the plane mirrors 54 is denoted by L.

As a result of comparison of the height HH and the size L in the second comparative example with the height HH1 and L1 in the second embodiment, the relationships of HH1<HH and L1<L are given. Accordingly, the imaging device (incident angle: 35°) in the second embodiment shown in FIG. 4 is apparently smaller than the imaging device in the second comparative example (incident angle: 45°) shown in FIG. 6.

From the above comparison, it becomes apparent that in each of the first and second embodiments shown in FIGS. 3 and 4, since the incident angle of a light beam traveling along the optical axis 7 of each lens 2 on the corresponding plane mirror 4 is set to 35°, which is smaller than 45° in each of the first and second comparative examples, the imaging device can be miniaturized without making the lens 2 close to the plane mirror 4.

Even if each camera body is large as described above, the imaging device can be miniaturized without interference between the adjacent two of the camera bodies. Accordingly, the configuration of each of the first and second embodiments is particularly effective for the imaging device including the cameras having large camera bodies.

According to the configuration of each of the first and second embodiments, since the incident angle of a light beam traveling along the optical axis 7 of each lens 2 on the corresponding plane mirror 4 is set to 35°, it is possible to make the whole height of the imaging device small and also make the bottom area of the octagonal pyramid (upper surface area of the inverted octagonal pyramid) formed by the plane mirrors, and hence to miniaturize the imaging device.

Since the imaging device can be miniaturized, it is possible to improve the degree of freedom in layout of the imaging device and the portability thereof, to reduce the sizes of optical parts such as mirrors and mechanical parts for supporting optical parts and hence to reduce the production cost, and to improve the accuracy of parts and hence to reduce parallax caused among a plurality of cameras.

It is to be noted that in each of the first and second embodiments shown in FIGS. 3 and 4, the incident angle of a light beam traveling along the optical axis 7 of each lens 2 on the corresponding plane mirror 4 is set to 35°; however, the present invention is not limited thereto, and the same effect of miniaturizing the imaging device can be obtained by setting the incident angle to a value of less than 45°.

[Embodiment 3]

A third embodiment of the imaging device of the present invention will be described with reference to FIG. 7.

Figure 7:
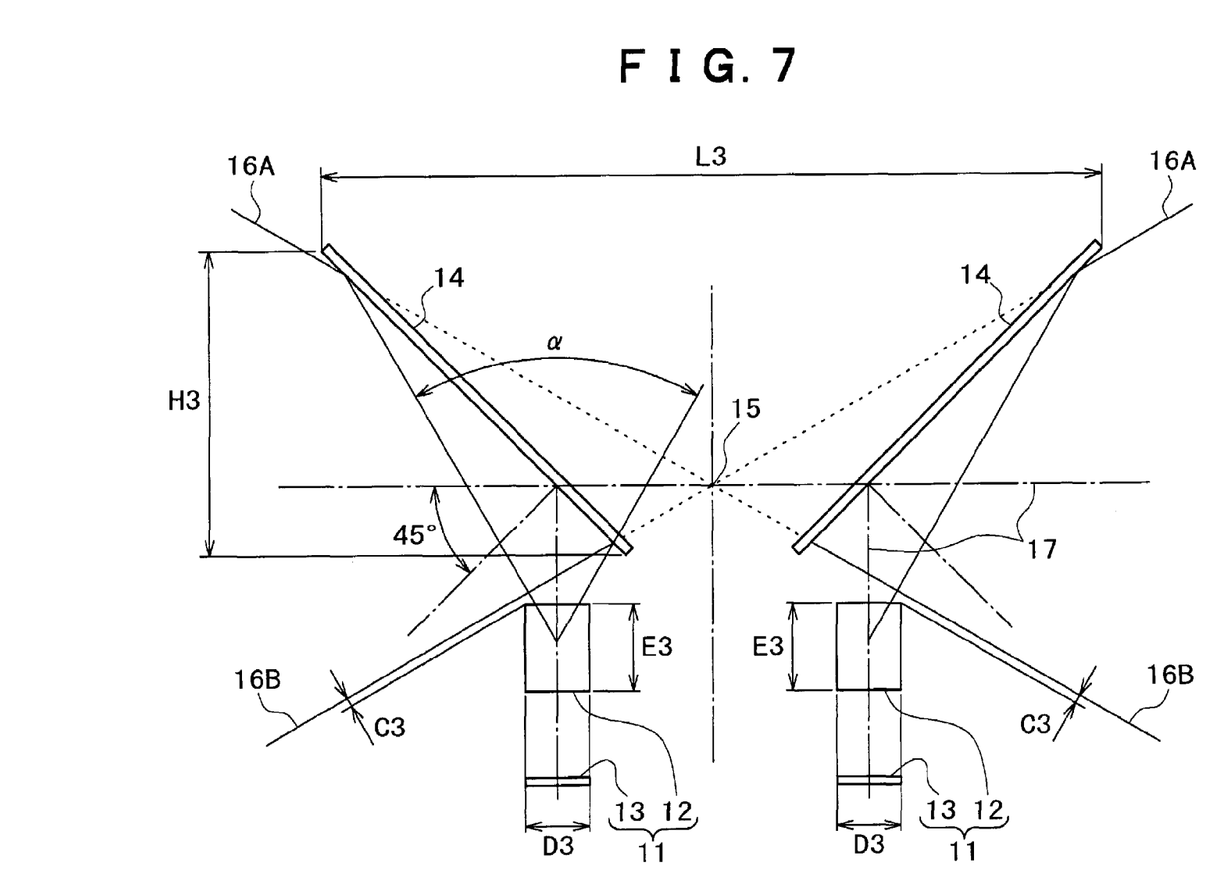
FIG. 7 is a schematic sectional view showing a configuration of a third embodiment of the imaging device of the present invention.

FIG. 7 is a schematic sectional view showing a configuration of the third embodiment of the imaging device of the present invention.

Referring to FIG. 7, the imaging device according to this embodiment includes eight plane mirrors 14 disposed into an octagonal pyramid shape, and eight cameras 11 disposed in such a manner as to individually face to the eight plane mirrors 14. In the figure, however, only the two plane mirrors 14 and the two cameras 11 disposed on a vertical plane passing through a center line of the imaging device are shown.

It is to be noted that the eight plane mirrors 14 are provided in this embodiment; however, the present invention is not limited thereto but may be configured such that a plurality of the plane mirrors 14 may be disposed in a polygonal pyramid shape and the cameras 11 of the same number be disposed in such a manner as to individually face to the plurality of the plane mirrors 14.

Each of the cameras 11 is provided with a lens 12 and an imaging element 13 in such a manner that the lens 12 is mounted to a camera body (not shown) in which the imaging element 13 and the like are housed.

A light beam reflects from each of the plane mirrors 14 and enters the lens 12 of the corresponding camera 11, to form an image on the imaging element 13 of the camera 11.

According to this imaging device, an incident angle of a light beam traveling along a lens optical axis 17 on each of the plane mirrors 14 is set to 45°.

The imaging device is further configured such that virtual centers 15 of view of the plurality of plane mirrors 14 are made to substantially correspond to each other. As a result, it is possible to suppress parallax caused among the plurality of cameras 11, and hence to acquire an image over a wide-angle field, specifically, over an omnidirectional or entire circumferential field by combining the images formed by the plurality of cameras 11 with each other.

According to this embodiment, particularly, a lens having a leading end whose diameter D3 is small is used as the lens 12 of each of the cameras 11.

By using the lens having the leading end whose diameter D3 is small as the lens 12, it is possible to loosen, when each lens 12 is made close to the corresponding plane mirror 14 as described with reference to FIG. 2, the limitation (the distance between a light beam 16B passing through a lowermost end of the field of view expressed by an angle of view and a corner of a leading end portion of the lens 12 must be set at a positive value) for preventing occurrence of the "vignetting" by the corner of the leading end portion of the lens 12, and hence to further miniaturize the imaging device.

In this regard, according to this embodiment, the lens 12 of each of the cameras 11 is specified such that letting D be a diameter of a leading end portion of a lens of a camera, A be a diagonal length of an imaging element of the camera, and "f" be a focal distance of the lens, the values D, A and "f" are determined to satisfy the following equations:

$$D/A < 4 \quad (1)$$

$$f/D > 0.15 \quad (2)$$

The above equations (1) and (2) means that at an angle of view, which satisfies the equations (1) and (2), or more, the diameter D of the leading end of the lens becomes small relative to the sizes of the lens and the imaging element, thereby miniaturizing the imaging device.

For example, it is assumed that a distance C3 between the light beam 16B passing through the lowermost end of the field of view and a corner of a leading end of each lens 12 is C3=0.85 mm, the diameter D3 of the leading end of the lens 12 is D3=15 mm, a length E3 of the lens 12 is E3=18 mm, an angle α of view of the lens 12 associated with a long side of a rectangular shape of the imaging element 13 is α=60°, a diagonal length A3 of the imaging element 13 is A3=6 mm, and a focal distance f3 of the lens 12 is f3=4.5 mm.

By substituting the above values in the equations (1) and (2), there are obtained the following results:

$$D/A = D3/A3 = 15/6 = 2.5 < 4$$

$$f/D = f3/D3 = 4.5/15 = 0.3 > 0.15$$

Accordingly, the above dimensional configuration satisfies the equations (1) and (2).

In the above dimensional configuration, a height H3 from an upper end of each plane mirror 14 and a lower end thereof and a size L3 of an upper surface of the inverted octagonal pyramid, which mainly determine the size of the imaging device, are H3=59 mm and L3=155 mm. A height from the upper end of each plane mirror 14 to a lower end of the corresponding lens 12 is 90 mm. In addition, the whole size of the imaging device is equivalent to a height from the upper end of each plane mirror 14 to a lower end of the corresponding camera 11.

According to this embodiment, the diameter D3 of the leading end portion of the lens 12 of each camera 11, the focal distance f3 of the lens 12, and the diagonal length A3 of the imaging element 13 of the camera 11 satisfy the equations of D3/A3<4 and f3/D3>0.15, and consequently, in a state that the diagonal length A3 of the imaging element 13 and the focal distance f3 of the lens 12 are determined, that is, in the case of using the same camera 11, the diameter D3 of the leading end of the lens 12 can be made small, to thereby miniaturize the imaging device.

Since the imaging device can be miniaturized, it is possible to improve the degree of freedom in layout of the imaging device and the portability thereof, to reduce the sizes of optical parts such as mirrors and mechanical parts for supporting optical parts and hence to reduce the production cost, and to improve the accuracy of parts and hence to reduce parallax caused among a plurality of cameras.

[Embodiment 4]

A fourth embodiment of the imaging device of the present invention will be described with reference to FIG. 8.

Figure 8:
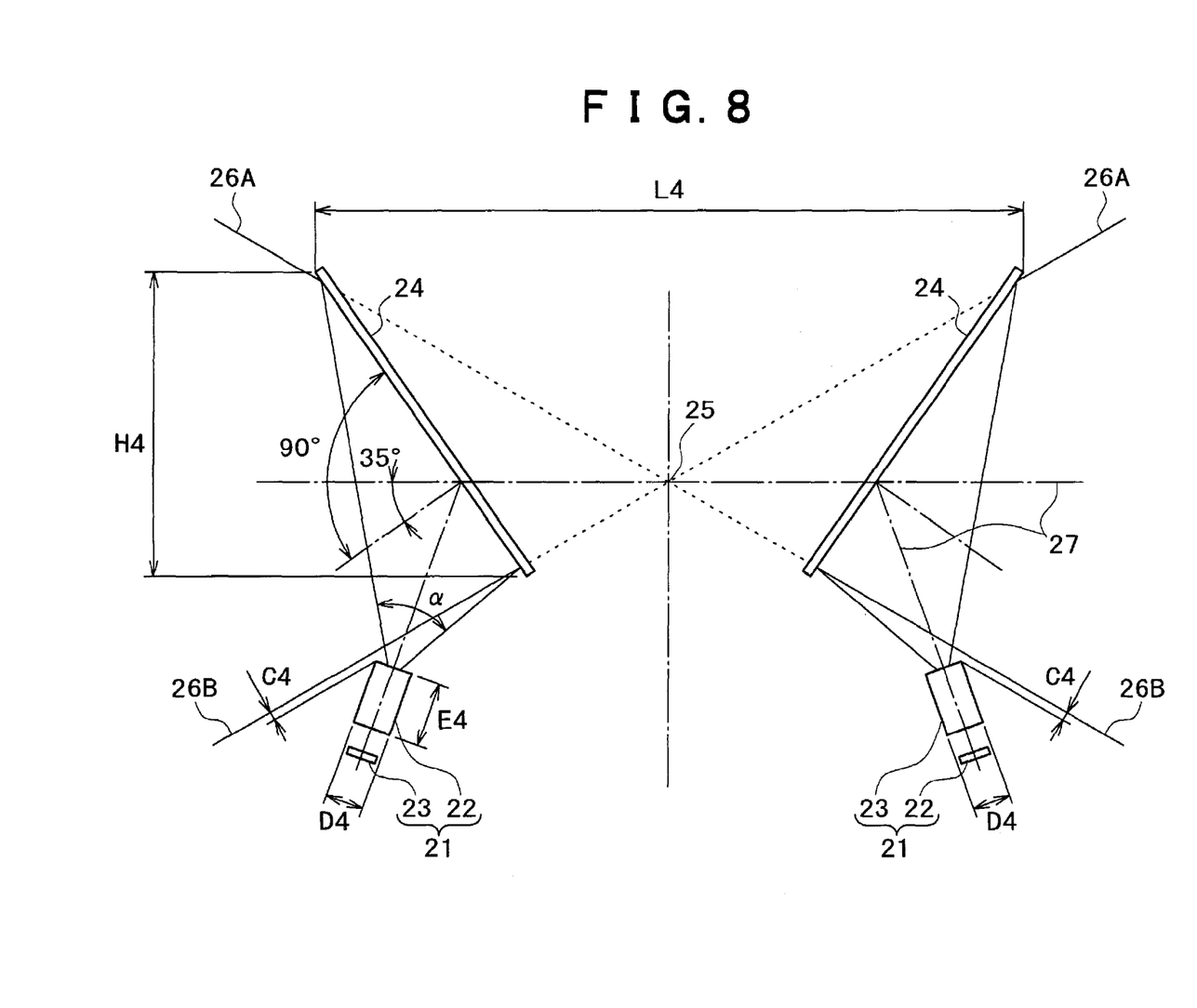
FIG. 8 is a schematic sectional view showing a configuration of a fourth embodiment of the imaging device of the present invention.

FIG. 8 is a schematic sectional view showing a configuration of the fourth embodiment of the imaging device of the present invention.

Referring to FIG. 8, the imaging device according to this embodiment includes eight plane mirrors 24 disposed into an octagonal pyramid shape, and eight cameras 21 disposed in such a manner as to individually face to the eight plane mirrors 24. In the figure, however, only the two plane mirrors 24 and the two cameras 21 disposed on a vertical plane passing through a center line of the imaging device are shown.

It is to be noted that the eight plane mirrors 24 are provided in this embodiment; however, the present invention is not limited thereto but may be configured such that a plurality of the plane mirrors 24 may be disposed in a polygonal pyramid shape and the cameras 21 of the same number be disposed in such a manner as to individually face to the plurality of the plane mirrors 24.

Each of the cameras 21 is provided with a lens 22 and an imaging element 23 in such a manner that the lens 22 is mounted to a camera body (not shown) in which the imaging element 23 and the like are housed.

A light beam reflects from each of the plane mirrors 24 and enters the lens 22 of the corresponding camera 21, to form an image on the imaging element 23 of the camera 21.

According to this embodiment, an incident angle of a light beam traveling along a lens optical axis 27 on each of the plane mirrors 24 is set to 35°.

The imaging device is further configured such that virtual centers 25 of view of the plurality of plane mirrors 24 are made to substantially correspond to each other. As a result, it is possible to suppress parallax caused among the plurality of cameras 21, and hence to acquire an image over a wide-angle field, specifically, over an omnidirectional or entire circumferential field by combining the images formed by the plurality of cameras 21 with each other.

Even in this embodiment, a lens having a leading end whose diameter D4 is small is used as the lens 22 of each of the cameras 21.

By using the lens having the leading end whose diameter D4 is small as the lens 22, it is possible to loosen, when each lens 22 is made close to the corresponding plane mirror 24, the limitation for preventing occurrence of the "vignetting" by the corner of the leading end portion of the lens 22, and hence to further miniaturize the imaging device.

Further, in this embodiment, the lens 22 of each of the cameras 21 is specified to satisfy the above-described equations (1) and (2).

In this way, according to this embodiment, the configuration that the lens 22 satisfies the equations (1) and (2) is combined with the configuration that the incident angle of a light beam traveling along the lens optical axis to a plane mirror is set to be less than 45°.

For example, it is assumed that a distance C4 between the light beam 26B passing through the lowermost end of the field of view and a corner of a leading end of the lens 22 is C4=1 mm, the diameter D4 of the leading end of the lens 22 is D4=9 mm, a length E4 of the lens 22 is E4=17 mm, an angle α of view of the lens 22 associated with a long side of a rectangular shape of the imaging element 23 is α=60°, a diagonal length A4 of the imaging element 23 is A4=6 mm, and a focal distance f4 of the lens 22 is f4=4.5 mm.

By substituting the above values in the equations (1) and (2), there are obtained the following results:

$$D/A = D4/A4 = 9/6 = 1.5 < 4$$

$$f/D = f4/D4 = 4.5/9 = 0.5 > 0.15$$

Accordingly, the above dimensional configuration satisfies the equations (1) and (2).

In the above dimensional configuration, a height H4 from an upper end of each plane mirror 24 and a lower end thereof and a size L4 of an upper surface of the inverted octagonal pyramid, which mainly determine the size of the imaging device, are H4=74 mm and L4=171 mm. A height from the upper end of each plane mirror 24 and a lower end of the corresponding lens 22 is 111 mm. In addition, the whole size of the imaging device is equivalent to a height from the upper end of each plane mirror 24 to a lower end of the corresponding camera 21.

According to this embodiment, the diameter D4 of the leading end portion of the lens 22 of each camera 21, the focal distance f4 of the lens 22, and the diagonal length A4 of the imaging element 23 of the camera 21 satisfy the equations of D4/A4<4 and f4/D4>0.15, and consequently, in a state that the diagonal length A4 of the imaging element 23 and the focal distance f4 of the lens 22 are determined, that is, in the case of using the same camera 21, the diameter D4 of the leading end of the lens 22 can be made small, to thereby miniaturize the imaging device.

Since the imaging device can be miniaturize, it is possible to improve the degree of freedom in layout of the imaging device and the portability thereof, to reduce the sizes of optical parts such as mirrors and mechanical parts for supporting optical parts and hence to reduce the production cost, and to improve the accuracy of parts and hence to reduce parallax caused among a plurality of cameras.

[Embodiment 5]

A fifth embodiment of the imaging device of the present invention will be described with reference to FIG. 9.

Figure 9:
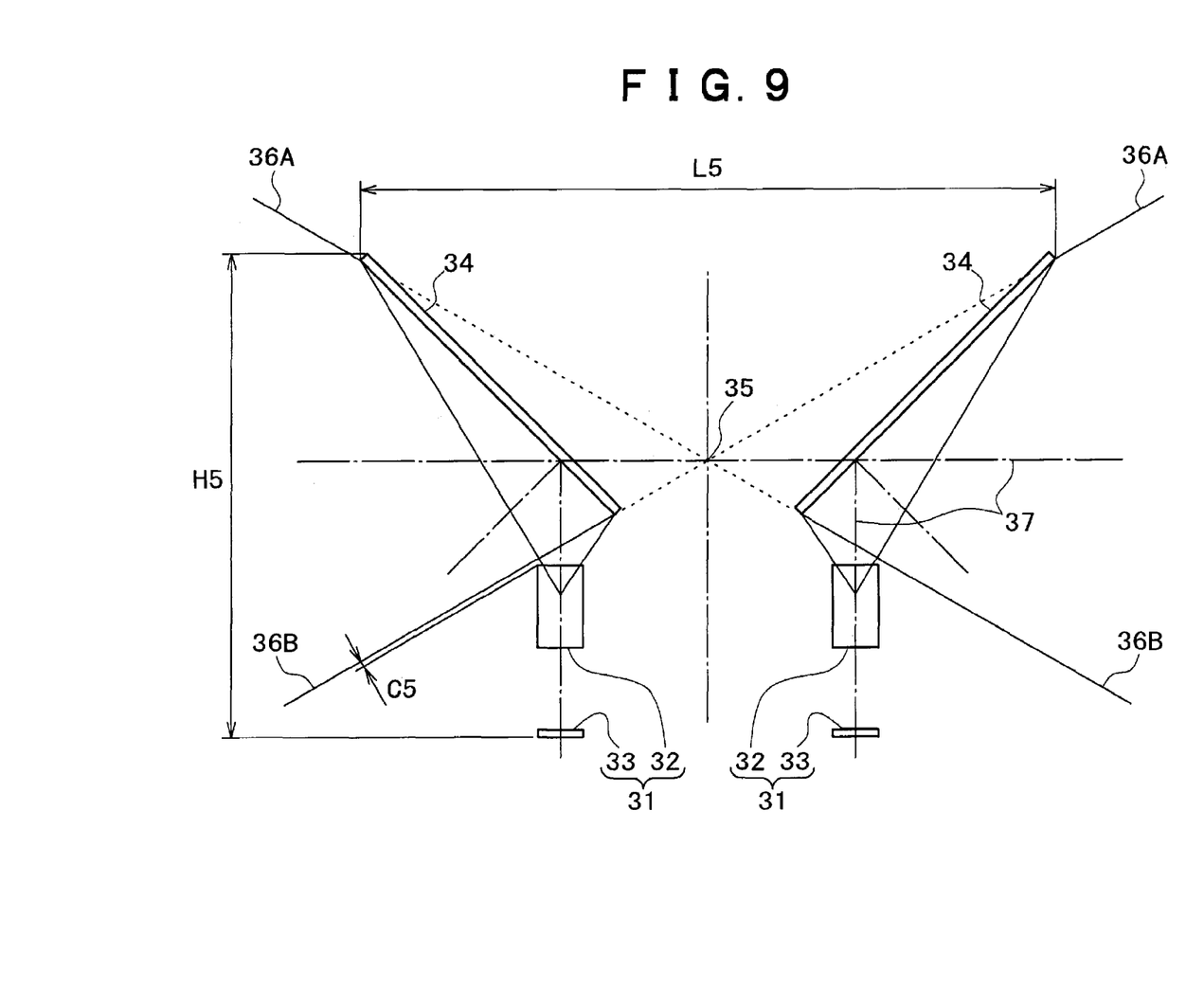
FIG. 9 is a schematic sectional view showing a configuration of a fifth embodiment of the imaging device of the present invention.

FIG. 9 is a schematic sectional view showing a configuration of the fifth embodiment of the imaging device of the present invention.

Referring to FIG. 9, the imaging device according to this embodiment includes eight plane mirrors 34 disposed into an octagonal pyramid shape, and eight cameras 31 disposed in such a manner as to individually face to the eight plane mirrors 34. In the figure, however, only the two plane mirrors 34 and the two cameras 31 disposed on a vertical plane passing through a center line of the imaging device are shown.

It is to be noted that the eight plane mirrors 34 are provided in this embodiment; however, the present invention is not limited thereto but may be configured such that a plurality of the plane mirrors 34 may be disposed in a polygonal pyramid shape and the cameras 31 of the same number be disposed in such a manner as to individually face to the plurality of the plane mirrors 34.

Each of the cameras 31 is provided with a lens 32 and an imaging element 33 in such a manner that the lens 32 is mounted to a camera body (not shown) in which the imaging element 33 and the like are housed.

A light beam reflects from each of the plane mirrors 34 and enters the lens 32 of the corresponding camera 31, to form an image on the imaging element 33 of the camera 31.

According to this embodiment, an incident angle of a light beam traveling along a lens optical axis 37 on each of the plane mirrors 34 is set to 45°.

The imaging device is further configured such that virtual centers 35 of view of the plurality of plane mirrors 34 are made to substantially correspond to each other. As a result, it is possible to suppress parallax caused among the plurality of cameras 31, and hence to acquire an image over a wide-angle field, specifically, over an omnidirectional or entire circumferential field by combining the images formed by the plurality of cameras 31 with each other.

According to this embodiment, it is intended to further miniaturize the imaging device by setting a distance C5 between a light beam 36B passing through a lowermost end of the field of view expressed by an angle of view and a corner of a leading end of each lens 32 at a sufficiently small value.

Concretely, according to this embodiment, the lens 32 of each of the cameras 31 is specified such that letting C be a distance between a light beam passing through a lowermost end of the field of view expressed by an angle of view and a corner of a leading end of a lens of a camera and A be a diagonal length of an imaging element of the camera, the values C and A are determined to satisfy the following equation:

$$0<C<2A \quad (3)$$

The above equation means that the distance between a light beam passing through the lowermost end of the field of view and the corner of the leading end of the lens can be made sufficiently small relative to the size of the imaging element, to thereby miniaturize the imaging device.

For example, it is assumed that the distance C5 between the light beam 36B passing through the lowermost end of the field of view and a corner of a leading end of the lens 32 is C5=0.36 mm and the diagonal length A5 of the imaging element 33 is A5=6 mm.

By substituting the above values in the equation (3), there is obtained a result of 0<C(=C5=0.36)<2A(=2·A5=12).

Accordingly, the above dimensional configuration satisfies the equation of 0<C<2A.

In the above dimensional configuration, a height H5 from an upper end of each plane mirror 34 and a lower end of the camera 31 (more specifically, a lower end of the imaging element 33) and a size L5 of an upper surface of the inverted octagonal pyramid, which mainly determine the size of the imaging device, are H5=24 mm and L5=56 mm.

According to this embodiment, the distance C5 between the light beam 36B passing through the lowermost end of the field of view and a corner of a leading end of the lens 32 and the diagonal length A5 of the imaging element 33 of the camera 31 satisfy the equation of 0<C5<2·A5, and consequently, in a state that the diagonal length A5 of the imaging element 33 is determined, that is, in the case of using the same camera 31, the distance C5 between the light beam 36B passing through the lowermost end of the field of view and the corner of the leading end of the lens 32 can be made small, to thereby miniaturize the imaging device.

Since the imaging device can be miniaturized, it is possible to improve the degree of freedom in layout of the imaging device and the portability thereof, to reduce the sizes of optical parts such as mirrors and mechanical parts for supporting optical parts and hence to reduce the production cost, and to improve the accuracy of parts and hence to reduce parallax caused among a plurality of cameras.

It is to be noted that the imaging device of the present invention can be configured by combining two or three of the above-described configurations of the present invention, that is, the configuration that the incident angle of a light beam traveling along a lens optical axis to a plane mirror is set to be less then 45°, the configuration of satisfying the equation (1) of D/A<4 and the equation (2) of f/D>0.15, and the configuration of satisfying the equation (3) of 0<C<2A. With this combination, the imaging device can be more effectively miniaturized.

While the preferred embodiments of the present invention have been described using specific terms, such description is for illustrative purposes only, and it is to be understood that changes and modifications may be made without departing from the spirit or scope of the following claims.

What is claimed is:

1. An imaging device comprising:
a plurality of plane mirrors disposed into a polygonal pyramid shape; and
a plurality of cameras disposed so as to individually face to said plurality of plane mirrors;
wherein each of said plurality of cameras includes a lens, and an incident angle of a light beam traveling along an optical axis of said lens of each of said plurality of cameras on the corresponding one of said plurality of plane mirrors is less than 45°.

2. An imaging device according to claim 1, further comprising:
a lens group composed of a plurality of lenses;
wherein said plane mirrors are disposed between said lens group and a lens group composed of said lenses of said plurality of cameras.

3. An imaging device comprising:
a plurality of plane mirrors disposed into a polygonal pyramid shape; and
a plurality of cameras disposed so as to individually face to said plurality of plane mirrors;
wherein each of said plurality of cameras includes a lens and an imaging element, and letting D be a diameter of a leading end portion of said lens of each of said plurality of cameras, "f" be a focal distance of said lens, and A be a diagonal length of said imaging element of each of said plurality of cameras, the values D, "f" and A are determined to satisfy equations of $D/A<4$ and $f/D>0.15$.

4. An imaging device comprising:

a plurality of plane mirrors disposed into a polygonal pyramid shape; and a plurality of cameras disposed so as to individually face to said plurality of plane mirrors;

wherein each of said plurality of cameras includes a lens and an imaging element, and letting C be a distance between a corner of a leading end portion of said lens of each of said plurality of cameras and a light beam passing through an end, closest to said corner of said lens, of the field of imaging expressed by an angle of view, and A be a diagonal length of said imaging element of each of said plurality of cameras, the values C and A are determined to satisfy an equation of $0<C<2A$.

* * * * *